United States Patent [19]
Solomon

[11] Patent Number: 5,593,600
[45] Date of Patent: Jan. 14, 1997

[54] METHOD OF DESANDING, DESALTING AND CONCENTRATING ORGANIC WASTES

[76] Inventor: William E. Solomon, 6700 E. Larimer County Rd. 92, Carr, Colo. 80612

[21] Appl. No.: 523,153

[22] Filed: Sep. 5, 1995

[51] Int. Cl.[6] .................................................. B01D 21/26
[52] U.S. Cl. ........................... 210/787; 210/806; 100/117
[58] Field of Search .................................... 210/787, 788, 210/806, 512.1, 512.2; 100/117; 209/711, 71 S, 727, 728, 729

[56] References Cited

U.S. PATENT DOCUMENTS

| | | | |
|---|---|---|---|
| 5,185,087 | 2/1993 | Lister et al. | 210/787 |
| 5,205,930 | 4/1993 | Obsrestad | 100/117 |

*Primary Examiner*—David A. Reifsnyder
*Attorney, Agent, or Firm*—Larry D. Johnson

[57] ABSTRACT

A method of recovering and converting organic waste material into more useful products. More specifically the organic waste is slurried with water, passed through hydrocyclones for desanding and desalting, then dewatered through a mechanical press. The dewatered, desalted solids can be used as soil ammnedment, peat substitute, growing media, fertilizer carrier, fuel for co-gen plants, or composted. The water may be reused for slurry, irrigation, or discarded.

3 Claims, 1 Drawing Sheet

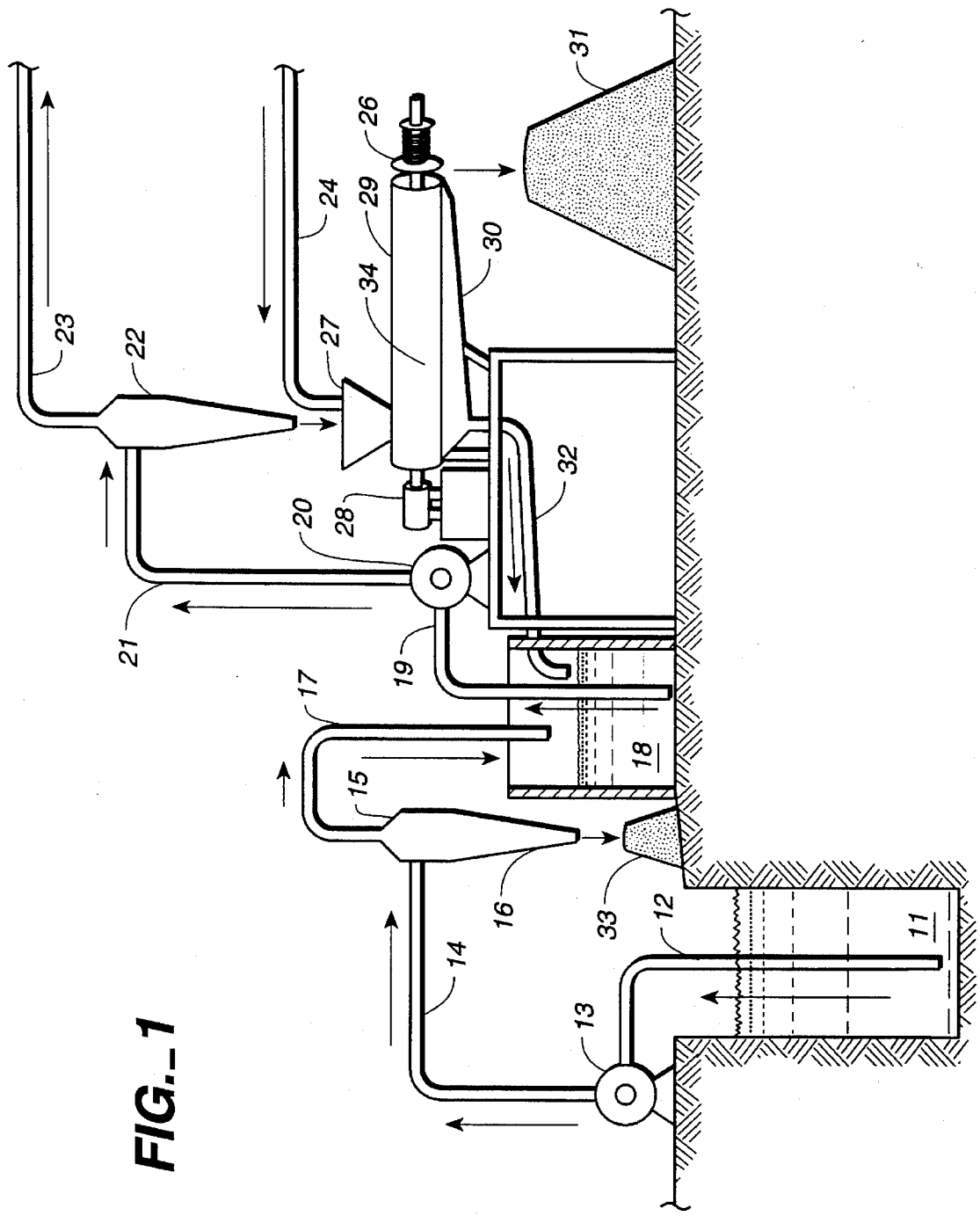
FIG._1

METHOD OF DESANDING, DESALTING AND CONCENTRATING ORGANIC WASTES

BACKGROUND OF THE INVENTION

1. Field of the Invention

The present invention is broadly concerned with recovering and cleansing organic wastes from liquid slurries. More specifically it is a method of removing sand and soluble salts from the organic solids and concentrating and dewatering the solids to yield a low salt, high organic material that can be used as a peat substitute, growing media, fertilizer carrier, soil ammendment, composting material, or fuel for co-gen plants.

2. Description of the Prior Art

Many different organic wastes are produced each day. This invention is concerned with those that can be handled and pumped as a liquid, usually above 95% water and less than 5% suspended solids, hereinafter a "slurry". These slurries consist of a liquid (usually water), organic parts of plants, dissolved minerals (soluble salts) and sand and dirt contamination. When the slurry is mechanically screened or dried by evaporation, the salts and sand and dirt remain with the solids and limit the use and value of the solids. Examples of some slurries are trim and rejects from vegetable processing plants, peeling wastes from potato processors, offal from livestock slaughter plants, manure slurries from livestock and poultry producing facilities, distillers grains from alchohol plants and breweries. There have been many different attempts to dispose of these wastes such as livestock feed, landfill burial, soil application, biological degradation in lagoons, or just release to surface streams or lakes. Sand and dirt contamination may be high, limiting the use as livestock feeds or as a fuel source. Landfill burial of organic wastes with high soluble salts can cause ground water polution. Harmful salts limit the use as soil application. Biological degradation is difficult and costly due to high BOD (Biological Oxygen Demand). The desanding, desalting, and concentration of these wastes converts them into a usable form that can be used in many beneficial ways. The United States imports over 500,000 tons per year of sphagnum peat moss. Treated properly, organic wastes can be substituted for sphagnum peat moss in planting mixes. With soluble salts removed organic wastes can be used as soil ammendments, increasing organic matter and water holding capacity of the soil. They can be used for bedding in livestock and poultry production. A continual supply of low ash organic material is needed as fuel for electrical generation plants.

Solid separation from the slurry is normally attemped by passing the slurry over a screen. Organic wastes separated this way retain a high level of soluble salts, limiting their use in soils, feeds, fertilizers, or growing media. Screens continually plug up and become less efficient. Sand is separated as a part of the solid portion, limiting use as generation plant fuel and causing costly wear on equipment. U.S. Pat. No. 5,185,087 uses hydrocyclone with ruminant waste for concentrating, then allowing the solids to drain at will. The extent of salt removal is not controlled, water removal is not as complete as needed and sand contamination remains with the solids.

OBJECTS OF THE INVENTION

It is therefore the general object of this invention to remove sand and dirt from the slurry to prevent them from being recovered with the organic solids.

It is another general object of this invention to dewater and concentrate the organic solids.

It is a more specific object of this invention to remove the soluble salts from the organic solids which will increase their value and usage.

These and other objects will become apparent upon consideration of the description which follows:

BRIEF DESCRIPTION OF THE DRAWING

FIG. 1 is a diagrammatic side elevational view of the invention.

SUMMARY OF THE INVENTION

The present invention overcomes the problems of desalting and dewatering organic wastes as well as removal of dirt and sand in the resulting organic product and provides an improved product suitable for more uses and markets. Broadly speaking the method of the invention is to pump the slurry through a sand removal hydrocyclone, then pump it through another hydrocyclone that removes salts, and then allow the solids to pass through a mechanical press (preferably an auger press) for dewatering and further salt removal if necessary. Hydrocyclones work on the same principal as dust cyclones where air and dust are forced into the top of a cone on a tangent. The cyclonic force moves the heavier dust to the outside, allowing it to drop out of the bottom of the cone by the force of gravity while the largest volume of air exits out the top. In the hydrocyclone, liquid replaces the air. The hydrocyclones are sized according to volume of liquid needed to pump. The amount of pressure pumped to the hydrocyclone determines the cyclonic speed and gravitational force.

In more detail, the first hydrocyclone the slurry passes through is one designed for high volume, low pressure which carries the organic waste slurry out the top while the sand and dirt drop out the bottom. The second hydrocyclone is designed for low volume and high pressure which increases the gravitational force up to 3000 times the force of gravity. This high force breaks up the organic material, allowing very efficient washing. The soluble salts go out the top of the cone and the solids drop out the bottom. The auger press is a metal tube having a screen material as the bottom portion of the tube. A driven auger through the center of the tube moves the solids to the exit end of the tube which has a spring loaded or weighted plate that forces the material to be squeezed before dropping out the end.

Organic solids that have been mechanically screened have conductivity levels of 10 to above 30 mmhos/cm saturated extract. When processed through the present invention, conductivity is lowered to less than 2 mmhos/cm. This is low enough to germinate seeds (normally 3 mmhos/cm or less is needed) and allow plant growth. Organic waste processed by the present invention from salty dairy manure was placed in germination trays and saturated with water. Forty eight tomato seeds were planted in the solids. No additional water was added for 4 weeks. 100% germination occurred and all plants survived showing no high salt effects. Conductivity measurement on the processed material was 1.6 mmho/cm.

The organic material absorbs 700 percent of its dry weight in water, adequate for a sphagnum peat moss substitute. Ashing organic wastes by burning them at 600 degrees C. is a measure of the mineral and salt content. Mechanically screened organic wastes that contain 20 to 40 percent ash are lowered by this invention to less than 10 percent, the normal mineral concentration of the organic material when not contaminated. been used separately for other purposes, the present invention is using them in combination for a specific use to obtain a desirable product from a troublesome waste.

DESCRIPTION OF THE PREFERRED EMBODIMENT

Following the diagram of this invention in FIG. 1, the first collection pit 11 collects the slurry from the source. A pump 13 pulls the slurry from the first collection pit 11 and delivers it through a conduit 14 to the first hydrocyclone 15. This hydrocyclone 15 is a high volume, low pressure (less than 20 psi) apparatus which allows the lighter organic waste and soluble salts to be carried out the top via a conduit 17 and into a second collection pit 18. The lower end 16 of the hydrocyclone 15 allows the separated sand and dirt to exit onto a pile 33 on an incline that allows excess water to drain back to the first collection pit 11. The sand and dirt may be discarded, used for fill, planting mixes, etc. as they do not contain high soluble salts. The second pump 20 picks up the sandless organic slurry from the second collection pit 18 through a conduit 19 and forces it up through another conduit 21 to the second hydrocyclone 22. The second hydrocyclone 22 is designed for low volume, high pressure (normally 40 psi to 70 psi, preferably 55 psi). Water and soluble salts pass out the top of the second hydrocyclone 22 via a conduit 23 back to first collection pit 11 to be reused or to another holding tank for irrigation or discarded. The organic waste solids with approximately 10% to 20% of the volume of water exits out the bottom of the second hydrocyclone 22 into an auger press 29 through a funnel opening 27. Fresh water may be added through a conduit 24 into the auger opening 27 if it is determined additional washing and salt removal is needed for specific products. The auger press 29 has a screened bottom, ($\frac{1}{10}$ to $\frac{1}{1000}$ inch opening depending desired results), that lets excess water flow into a catch pan 30 and out through a conduit 32 back to either collection pit. The auger 34 is driven at 3 to 15 RPM by a motor and gearbox 28. Organic solids are conveyed to the end where it is squeezed by pressure on the spring loaded pressure plate 26 until it is forced out and falls into pile 31.

To synchronize slurry flow, the first pump 13 is controlled by liquid level switches in the second collection pit 18. As the slurry level is lowered in the second collection pit 18 by the second pump 20, the first pump 13 is switched on so the second pump 20 has a continuous supply of slurry. The first pump 13 is controlled by a master liquid level switch in the first collection pit 11 so that when the first collection pit is empty, all systems shut down. The auger drive motor 28 and second pump 20 are controlled by master liquid level switch in the second collection pit 18 so that when empty, all systems shutdown.

As slurry is collected in the first collection pit 11, the first pump 13 turns on, raising liquid level in the second collection pit 18 which turns on the second pump 20 and auger drive motor 28. The system becomes virtually operator free, requiring only maintenance and removal of processed product.

Sizing of holding tanks, pumps, conduits and presses are dependent on volume of slurry to process, desired running time, and waste material characteristics. Placement of components may vary due to accomodations of existing facilities.

I claim:

1. A method of desalting, desanding, and concentrating an organic waste slurry, said slurry comprising a mixture of organic plant parts, sand and dirt, water soluble salts, and water, said method comprising the steps of:

collecting the slurry;

subjecting the collected slurry to a first cyclonic action having a first cyclone pressure to remove the sand and dirt from the slurry mixture;

subjecting the slurry from said first cyclonic action to a second cyclonic action having a second cyclone pressure greater than said first cyclone pressure to wash and remove the water soluble salts from the organic plant parts; and subjecting the organic plant parts from said second cyclonic action to a mechanical press for dewatering.

2. The method of claim 1 wherein said step of subjecting the collected slurry to a first cyclonic action having a first cyclone pressure to remove the sand and dirt from the slurry mixture comprises delivering the slurry to a first hydrocyclone having a pressure less than 20 psi.

3. The method of claim 1 wherein said step of subjecting the slurry from said first cyclonic action to a second cyclonic action having a second cyclone pressure greater than said first cyclone pressure to wash and remove the water soluble salts from the organic plant parts comprises delivering the slurry to a second hydrocyclone having a pressure of between 40 to 70 psi.

\* \* \* \* \*